(12) United States Patent
Sun et al.

(10) Patent No.: US 10,897,558 B1
(45) Date of Patent: Jan. 19, 2021

(54) SHALLOW DEPTH OF FIELD (SDOF) RENDERING

(71) Applicant: Apple Inc., Cupertino, CA (US)

(72) Inventors: Wei Sun, San Jose, CA (US); Philip G. Lee, San Jose, CA (US); Gregory Guyomarc'h, San Francisco, CA (US); Frederic Cao, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/566,017

(22) Filed: Sep. 10, 2019

Related U.S. Application Data

(60) Provisional application No. 62/729,536, filed on Sep. 11, 2018.

(51) Int. Cl.
*H04N 5/222* (2006.01)
*H04N 5/262* (2006.01)
*G06T 7/194* (2017.01)
*G06T 5/00* (2006.01)
*G06T 5/20* (2006.01)

(52) U.S. Cl.
CPC ........... *H04N 5/2226* (2013.01); *G06T 5/002* (2013.01); *G06T 5/20* (2013.01); *H04N 5/2621* (2013.01); *G06T 7/194* (2017.01)

(58) Field of Classification Search
CPC .... H04N 5/2621; H04N 5/2226; G06T 7/194; G06T 7/50–596
See application file for complete search history.

(56) References Cited

U.S. PATENT DOCUMENTS

| 8,823,778 | B2 | 9/2014 | Endo | |
|---|---|---|---|---|
| 8,885,941 | B2 | 11/2014 | Schiller | |
| 2012/0057070 | A1* | 3/2012 | Park | H04N 5/2356 348/345 |
| 2012/0320239 | A1* | 12/2012 | Uehara | H04N 5/23212 348/239 |
| 2015/0086127 | A1 | 3/2015 | Camilus | |
| 2015/0116546 | A1* | 4/2015 | Tanaka | H04N 5/23229 348/239 |
| 2016/0191788 | A1* | 6/2016 | Tanaka | G06K 9/52 348/349 |

(Continued)

*Primary Examiner* — Paul M Berardesca
(74) *Attorney, Agent, or Firm* — Blank Rome LLP

(57) ABSTRACT

This disclosure relates to the lightweight and efficient synthesis of shallow depth of field (SDOF) renderings. According to some embodiments, coarse focus information and semantic segmentation information may be leveraged to generate SDOF renderings in a "live preview" or "streaming" mode. Semantic segmentation may be defined as a process of creating a mask over an image, wherein pixels are segmented into a predefined set of semantic classes. Segmentations may include as many classes as are desired by a given implementation (e.g., a 'foreground' class and a 'background' class). In some embodiments, the rendering of synthetic SDOF images according to the techniques described herein may be completed using only a single camera of a device and without the use of dedicated depth-sensing technology (e.g., structured light cameras, stereo cameras, time-of-flight cameras, etc.), thereby allowing the SDOF rendering process to operate in a fashion that is not unduly time-, processing-, and/or power-intensive.

20 Claims, 12 Drawing Sheets

(56) References Cited

U.S. PATENT DOCUMENTS

2016/0381305 A1* 12/2016 Matsuoka ............... G06T 5/002
              348/239
2019/0253608 A1*  8/2019 Lee ........................ G06T 5/003
2020/0104034 A1*  4/2020 Lee ...................... H04N 5/2621

* cited by examiner

SHALLOW DEPTH OF FIELD (SDOF) RENDERING

TECHNICAL FIELD

This disclosure relates generally to the field of digital imaging. More particularly, but not by way of limitation, it relates to techniques for synthesizing shallow depth of field (SDOF) renderings in captured images.

BACKGROUND

In camera imaging, multiple factors, such as the size of the lens aperture, may influence the "depth of field" (DOF) of an image. For example, large digital single-lens reflex (DSLR) cameras and cameras having wide aperture lenses can be used to capture images with a relatively shallow depth of field, meaning that the range of scene depths for which objects in the captured image will appear sharp (i.e., in focus) is very small compared to images captured under other conditions (e.g., a narrower aperture). While the limited range of in focus regions of a SDOF image may seem to be a physical limitation, it has been turned into an aesthetic advantage applied by photographers for over a century. For example, so-called SDOF photography may be particularly fit for portrait photography, since it can emphasize the subject (who is typically brought into the camera's focus range), while deemphasizing the background, which may otherwise be of less interest in the scene (e.g., by making the background appear blurry and/or out of focus).

The advent of mobile, multifunction devices, such as smartphones and tablet devices, has resulted in a desire for small form factor cameras capable of quickly generating high levels of image quality for integration into such mobile, multifunction devices. Increasingly, as users rely on these multifunction devices as their primary cameras for day-to-day use, users demand features that they have become accustomed to using in dedicated-purpose camera devices, e.g., "portrait-style" SDOF photography modes.

In some instances, such as the aforementioned small form factor cameras used in mobile devices, it may be difficult to optically achieve a given level of SDOF. For example, a mobile device's camera may have a smaller aperture than the smallest aperture used by a DSLR camera, and thus may have a relatively large depth of field compared to what may be achieved by a DSLR camera. In these instances, to achieve an image having a shallower depth of field, it may be necessary to artificially synthesize an out-of-focus blur in the image after it is captured, e.g., by using estimated depth maps for the captured images.

For example, in such portrait-style, synthetic SDOF images, a greater amount of blurring may be applied to objects and pixels that are estimated to be farther away from the focal plane of a captured scene. In other words, in synthetic SDOF images having a focal plane in the foreground of the captured scene, objects that are "deeper" in the captured scene may have a greater amount of blurring applied to them, whereas foreground objects, such as a human subject, may remain relatively sharper, thus pleasantly emphasizing the appearance of the human subject to a viewer of the image.

In some cases, specialized depth-sensing technology, such as structured light cameras, time-of-flight (ToF) cameras, stereo cameras, etc., may be used to create an accurate (and/or high resolution) depth or disparity map over the captured scene, which may be used to determine how much blurring to apply to the various regions of the scene in the synthetic SDOF image. Some devices may not include such specialized depth-sensing technology, and, even in devices with such technology, time, processing, and/or power constraints may limit the availability of such methods of generating high quality (and/or high resolution) depth or disparity maps in certain instances, such as when repeated synthetic SDOF images are called for in a short time frame (e.g., in generating a live preview or capturing a video stream with a synthetic SDOF effect).

In other cases, scene depth can be estimated by single camera devices using approaches such as "depth from focus" or "structure from motion" techniques. However, these approaches may require the capture of several images to estimate depth information, thus taking additional time or costing additional storage capacity, which may not be suitable in instances where SDOF rendering operations need to be applied to several images in a short period of time (such as the aforementioned situations of generating a live preview or capturing a video stream).

Thus, it may be desirable to have a system with the ability to create a synthetic SDOF effect in a fashion that is not unduly time-, processing-, and/or power-intensive, and which may be able to generate such synthetic SDOF images quickly and/or efficiently—without the need for specialized depth-sensing technology and/or multiple cameras.

SUMMARY

Camera devices, program storage devices, and related methods are disclosed herein that are configured to leverage coarse focus information and semantic segmentation information in image processing techniques, e.g., the generation of synthetic out-of-focus background rendering effects in images captured by a camera device.

The rendering of these effects may be used to create images that approximate the look of an image captured with a camera having a smaller depth of field. It should be appreciated that any description of creating/synthesizing/rendering an SDOF or out-of-focus effect from an image is meant to refer to a relative change in the depth of field of the image (i.e., the image has a first "large" depth of field when captured that is synthetically reduced to a smaller "shallow" depth of field) and not to imply any particular ranges of depth of field.

According to some embodiments disclosed herein, the camera devices may utilize a single camera with an image sensor to capture an input image of a scene, as well as obtain corresponding focus information for the captured scene, which focus information may provide an initial coarse estimate of the depth of the various portions of the captured scene, and which may be used to generate an initial depth map for the scene.

It is to be understood that, in the present disclosure, references to scene depth maps or the estimated values in a scene depth map need not refer to absolute scene depth values, but may instead refer to depths that are relative to a given position or perspective, e.g., a depth value may refer to a depth relative to a particular plane in a captured scene. The use of depth estimates and depth maps herein is also meant to encompass disparity estimates and disparity maps, which relate more particularly to measured differences in the position of corresponding parts of a scene captured from two or more different perspectives. For example, measured disparity values and the corresponding distance from the cameras capturing the scene are generally inversely related, with larger disparity values being reflective of objects or portions of a captured scene that are closer to the capturing camera (s). Disparity estimates may be converted into depth estimates using any desired known techniques.

In some embodiments, the initial focus information for the captured scene may be obtained by using phase detection (PD) pixels. (PD pixels may also be referred to as "focus pixels" or "phase detection auto-focus pixels" in the art.) PD pixels may be used to provide depth estimates based on phase detection for a captured scene based on a defocusing-dependent image shift that can be used, e.g., to guide autofocusing of a camera lens. Generally, PD pixels can be sparsely-distributed across an image sensor and generate a sparsely-sampled PD pixel image. Information obtained from PD pixels is also generally underexposed and noisy, as the effective apertures of PD pixels are typically reduced, as compared to regular pixels (e.g., non-PD pixels) of the image sensor. These aspects make generating high quality or high-resolution depth maps using information from PD pixels challenging. In other embodiments, the initial focus information may be obtained from focus blur estimates and/or focus position values.

According to some embodiments, the focus information data may be obtained in the form of an initial defocus map, e.g., a two-dimensional array of values, wherein each value is representative of a defocus score in the corresponding portion or sub-region of the captured scene, e.g., from which depth values relative to the camera's focus position may be estimated.

According to some embodiments, after obtaining the initial defocus map, it may be further refined, e.g., by leveraging semantic segmentation information, to label various sub-regions (e.g., tiles) within the image as being either foreground, background, or boundary sub-regions. Refinement operations may also be applied to the defocus map in order to fill in or correct any potentially invalid information in the defocus map. Next, the refined defocus map may be converted to an initial depth map. After any desired modifications are made to the initial depth map (e.g., upscaling and/or other thresholding or morphological operations), the semantic segmentation information may be combined with the initial depth map, e.g., in the form of an overlay on top of the depth map. In such cases, the semantic overlay may help enforce the assumption that it is desirable for the segmented object(s) to be in focus in the rendered SDOF images. For example, in some embodiments, a segmentation mask may be obtained that provides an indication of the portions of the captured image that contain "foreground" (or other types of segmented object in the scene that are desired to be in focus in a given implementation, e.g., "people"). After overlaying an in focus region on the initial depth map (wherein the in focus region corresponds to the obtained segmentation mask), a boundary of uncertainty may be added along the border between the segmentation mask and the rest of the initial depth map, which uncertainty boundary may be filled in using alpha matting or other desired blending techniques. Finally, the refined depth map with segmentation overlay may be used in an SDOF rendering process to generate the resultant synthetic SDOF image.

Some advantages of this hybrid depth and segmentation-based approach to rapidly generating synthetic SDOF images are that it will keep segmented objects in focus, while still allowing only moderate or no blurring in portions of the captured image that are not part of the segmented class but that are estimated to be closer to the focal plane of the image, i.e., rather than fully blurring any part of the image that is not a part of the segmented class. Parts of the image that are not a part of the segmented class but are also estimated to be far from the focal plane of the image (e.g., in the deep background of the scene) will be allowed to have an appropriate amount of blurring applied to them, thus resulting in a rendered SDOF image that approximates an actual SDOF captured image in a natural-looking manner.

Due to the lightweight and efficient nature of the SDOF rendering techniques described herein, such techniques may be advantageous in reducing latency in instances where the SDOF rendering operations are desired to be applied to several images in a short period of time, such as in the scenario of generating a live SDOF effect image preview or capturing a video stream of images to which SDOF effects are desired to be applied.

Thus, according to some embodiments, a non-transitory program storage device is disclosed. The program storage device is readable by one or more processors. Instructions are stored on the program storage device for causing the one or more processors to: obtain a first image of a scene, the first image comprising a first plurality of pixels; obtain a set of initial focus information for the first image; create a defocus map for the first image based, at least in part, on the obtained set of initial focus information; obtain at least one segmentation mask comprising a first plurality of segmentation values, wherein each segmentation value corresponds to a location in the scene; refine the defocus map, wherein refining the defocus map is based, at least in part, on the first plurality of segmentation values; generate an initial depth map based, at least in part, on the refined defocus map; generate a refined depth map based, at least in part, on a combination of the generated initial depth map and the obtained at least one segmentation mask; and generate a blurred version of the first image based, at least in part, on the refined depth map.

According to other embodiments, the set of initial focus information may be obtained from one or more phase detection pixels (and the initial focus information may have been initially obtained during the capture of one or more images, i.e., other than the first image itself). According to still other embodiments, the set of initial focus information for the first image may be captured by only a single camera. According to still other embodiments, the generation of the blurred version of the first image may be applied in a streaming image or preview image mode of a camera device. According to still other embodiments, the refined depth map may be upscaled to a desired resolution. According to still other embodiments, an unknown depth band may be added to the initial depth map, which band may be used to help blend between foreground and background regions in the rendered SDOF image. According to still other embodiments, one or more sub-regions in the segmentation mask (e.g., tiles) may be labeled as being at least one of: foreground sub-regions, background sub-regions, or boundary sub-regions, and the aforementioned refinement of the defocus map may be based, at least in part, on the labeling of the corresponding sub-regions of the segmentation mask.

Various methods of creating SDOF renderings are also disclosed herein, in accordance with the program storage device embodiments enumerated above.

Various electronic devices are also disclosed herein, in accordance with the program storage device embodiments enumerated above. Such electronic devices may comprise a memory, one or more image capture devices, a display, a user interface, and one or more processors operatively coupled to the memory. Instructions may be stored in the memory, the instructions causing the one or more processors to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

This disclosure relates to techniques for the synthesis of shallow depth of field (SDOF) image renderings in a lightweight and efficient fashion. According to some embodiments, coarse focus information and semantic segmentation information may be leveraged to generate SDOF image renderings in a "live preview" or "video capture" mode, that is, wherein SDOF renderings are desired to be applied to several image in a short period of time. Semantic segmentation may be defined as a process of creating a mask over an image, wherein pixels are segmented into a predefined set of semantic classes. Segmentations may include as many classes as are desired by a given implementation (e.g., a 'foreground pixel' class and a 'background pixel' class). In some embodiments, the synthesis of SDOF rendering techniques may be completed using only a single camera of an electronic device and without the use of dedicated depth-sensing technology (e.g., structured light cameras, stereo cameras, time-of-flight cameras, etc.), thereby allowing the SDOF rendering process to operate in a fashion that is lightweight and efficient from a time, processing, and/or power consumption standpoint.

Figure 1A:
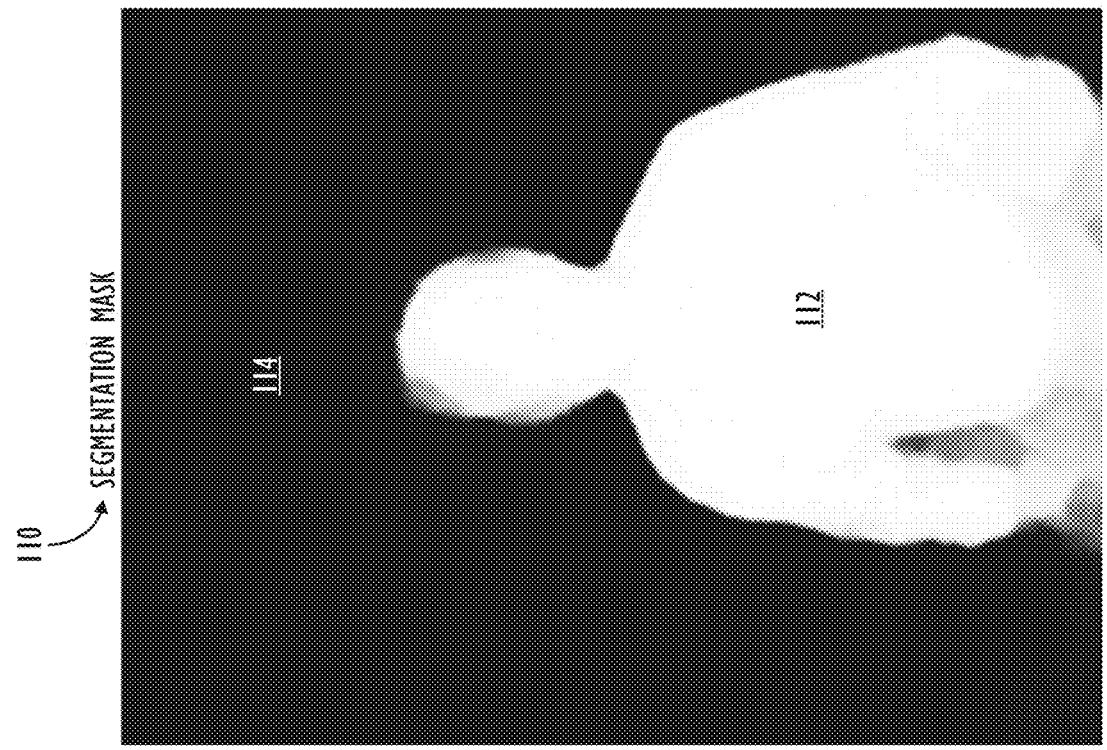
FIG. 1A includes an image of a scene to which synthetic SDOF effects are desired to be applied and a segmentation mask for the image.
Figure 1A:

Turning now to FIG. 1A, an image 100 of a scene to which synthetic SDOF effects are desired to be applied and a segmentation mask 110 for the image 100 are shown. As illustrated in FIG. 1A, the original image 100 features a human subject 105 in the foreground of the captured scene and various background elements, such as trees, grass, a walking path, a building, and the Sun. In typical SDOF photography, it may be desirable to have foreground objects, such as the human subject 105 (and other scene objects at approximately the same depth as human subject 105, e.g., a chair or bench the subject may be sitting on), appear in focus in the SDOF image, with the various background elements being blurred to varying extents. In some cases, it may be desirable to blur the various background elements in proportion with how deep in the scene (i.e., how far from the foreground human subject) such background elements are estimated to be. It is to be understood that, while the example of FIG. 1A is described in the context of a foreground human subject that is desired to be placed in focus, the desired focal plane may be anywhere within the captured scene, e.g., the background of the scene or at a middle depth in the captured scene, with objects at the depth of the desired focal plane being brought into focus, and other scene elements being blurred in proportion to how far away they are (e.g., shallower or deeper) from the desired focal plane.

Semantic segmentation masks, such as segmentation mask 110 for the image 100 in FIG. 1A, may be used to encode a mapping of image pixels (or groups of image pixels, in the event the segmentation mask has a different spatial resolution than the original captured image) into two or more semantic classes, where the classes describes the semantic object or category that the respective pixel belongs to. The segmentation mask 110 uses a convention wherein white pixels represent the regions 112 within image 100 determined to comprise 'foreground' pixels, and wherein black pixels represent the regions 114 within image 100 determined to comprise 'background' pixels.

Depending on the specific segmentation scheme used, pixel classifications may be discrete (i.e., to encode which class of a given set of classes a pixel belongs to) or continuous (i.e., to encode the probability of a pixel belonging to a certain class). For example, in some segmentation mask schemes, rather than the output being purely binary (e.g., wherein a value of 1='foreground' pixel, and a value of 0='background' pixel), the segmentation may produce a range of intermediate probability values (e.g., with 1 indicating highest confidence that a pixel is a foreground pixel, 0 indicating highest confidence that a pixel is a background pixel, and 0.5 indicating the least confidence in the pixel's classification as being either a foreground or background pixel). In addition to the segmentation mask itself, and depending on the segmentation scheme used, a confidence map (not shown) may also be generated corresponding to the segmentation mask. Such confidence maps may encode the relative confidence or certainty of the class predictions described by the segmentation mask. By leveraging confidence maps and/or continuous probabilities of semantic segmentations, algorithms can behave in a significantly more robust and responsive manner.

In some embodiments, the semantic segmentation may further comprise a form of instance segmentation. In instance segmentation, each separate instance of a person (or other semantic class of interest) that is found in the image may be encoded as a separate segmentation class. In such cases, instance segmentation may help prevent an SDOF effect rendering process from smoothing over the depth of an entire contiguous segmented area (i.e., pushing all the pixels in the contiguous segmented area to have the same depth and/or amount of blurring), which may look unnatural, especially in images where the contiguous segmented area may comprise multiple different people that are contiguous in the segmentation mask, but are actually positioned at different depths in the scene. As will be explained in further detail below, according to the techniques described herein, the use of segmentation information may be utilized, e.g., to refine obtained defocus information (as described with respect to FIG. 1E) and in generating a refined depth map to be used in the SDOF image rendering process (as described with respect to FIG. 1H).

Figure 1B:
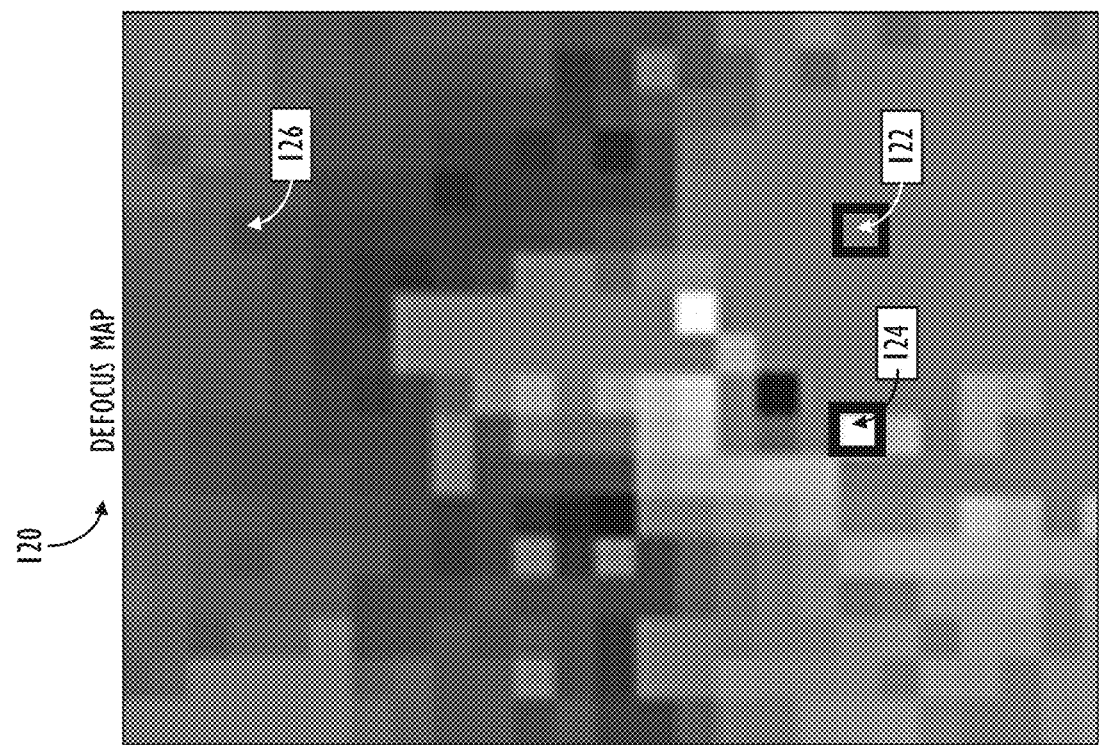
FIG. 1B includes the image shown in FIG. 1A, to which synthetic SDOF effects are desired to be applied, and a defocus map for the image, according to one or more embodiments disclosed herein.
Figure 1B:

Turning now to FIG. 1B, the image 100 from FIG. 1A of a scene to which synthetic SDOF effects are desired to be applied and a defocus map 120 for the image are shown, according to one or more embodiments. Note that image 100 in FIG. 1B is simply a reproduction of the image 100 shown in FIG. 1A, to which synthetic SDOF effects are desired to be applied. Image 100 is reproduced in FIG. 1B only for ease of comparison purposes with the defocus map 120 of FIG. 1B.

As mentioned above, an image capture device may concurrently capture focus information related to the captured scene during the live capture of images. One example of such focus information is referred to herein as "defocus" information, i.e., an estimate of how defocused a particular sub-region of the captured scene is relative to the focus position of the camera. Defocus map 120 may represent the output of a coarse set of defocus information obtained for image 100. For example, the data in the defocus map 120 may comprise a plurality of defocus scores, wherein each defocus score corresponds to a sub-region of image 100 (and, by extension, segmentation mask 110). In some embodiments, e.g., in the case of streaming images being captured (e.g., at a rate of 30 frames per second or more), it may take the capture of more than one streaming image to update the defocus scores for all regions of the captured scene. However, most parts of the captured scene will not experience large changes in depth within a few fractions of a second, so the focus information that is obtained for a given captured image is usually sufficient for the SDOF rendering techniques described herein, i.e., even if all the focus information was not obtained concurrently with the given captured image itself.

As illustrated in FIG. 1B, the defocus map 120 may intentionally (or of necessity) be a coarse, or low-resolution, defocus map. For example, the data in the defocus map 120 may comprise a plurality of defocus score values, wherein each value in defocus map 120 of FIG. 1B, as illustrated by the variously-shaded square regions (e.g., square 122) corresponds to a sub-region of the captured scene in image 100. As illustrated in FIG. 1B, regions in the defocus map 120 that are darker in color relate to regions of the captured scene that are estimated to be deeper in the background, and regions that are brighter in color relate to regions of the captured scene that are estimated to be more in the foreground. For example, square 124, which is white-colored, corresponds to an estimated foreground sub-region of the captured scene, and the squares in region 126, which includes generally darker-colored squares, corresponds roughly to the background of the captured scene. One issue with defocus maps, e.g., those comprising defocus scores obtained from PD pixels, is that they can be somewhat inaccurate (or be missing information), e.g., in low lighting conditions and/or in areas of a scene that are relatively free of texture (e.g., background sky), resulting in invalid defocus values. In some embodiments, the defocus scores in a given defocus map may also comprise a confidence score (e.g., a percentage from 0% to 100%), and defocus scores having less than or equal to a threshold confidence value may be classified as invalid values. In some embodiments, the threshold confidence value may be selected to be 0%. For example, in FIG. 1B, the medium-grayish areas in the defocus map 120 (e.g., square 122) represent invalid pixel values in the defocus information represented in defocus map 120. Thus, as will be explained in further detail below, it may be necessary or desirable to refine an initially-obtained defocus map to account for (or at least ameliorate) any invalid or missing information in the initial defocus map before using such a map to drive the SDOF image rendering process.

Figure 1C:
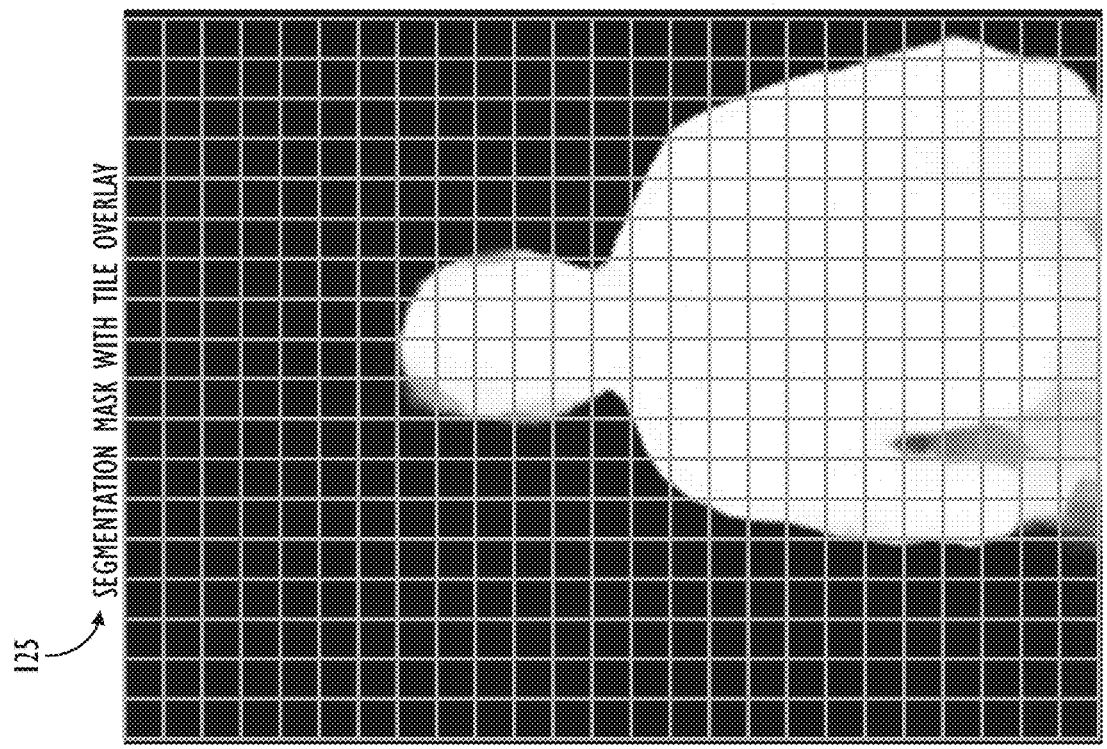
FIG. 1C includes a defocus map and a segmentation mask having a tile overlay for the image shown in FIG. 1A, according to one or more embodiments disclosed herein.
Figure 1C:
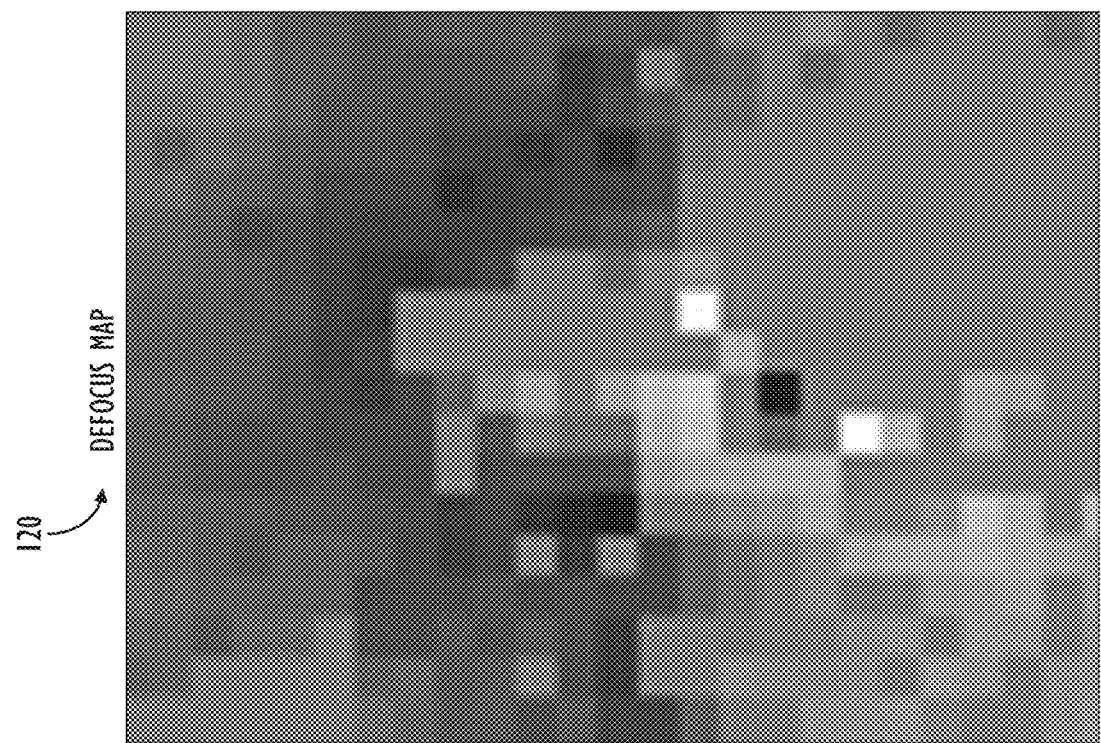

Turning now to FIG. 1C, the defocus map 120 and a segmentation mask having a tile overlay 125 for the image 100 shown in FIG. 1A, are shown, according to one or more embodiments disclosed herein. Segmentation mask having a tile overlay 125 represents the same information as contained in segmentation mask 110, described above with reference to FIG. 1A, simply with an additional overlay to show the locations of the various tile sub-regions that the information in the defocus map 120 corresponds to. For example, as shown in FIG. 1C, the tile overlay includes a tile overlay grid that is 18 tiles wide by 25 tiles long, though these dimensions are purely illustrative, and there may be a larger or smaller number of defocus values/tiles used in a given implementation. In some embodiments, each pixel in the defocus map 120 corresponds to a tile sub-region in the segmentation mask 125 (and, by extension, the corresponding sub-region in original image 100 and segmentation mask 110). As will be explained in further detail below, the values of the various pixels within a given tile region in the segmentation mask may be used to classify or label the corresponding pixel in the defocus map 120. Based on the classification given to a pixel in the defocus map 120, the refinement process described herein may determine whether the pixel needs to have its value refined and, if so, which other pixels in the defocus map should be used in the refinement operation.

Figure 1D:
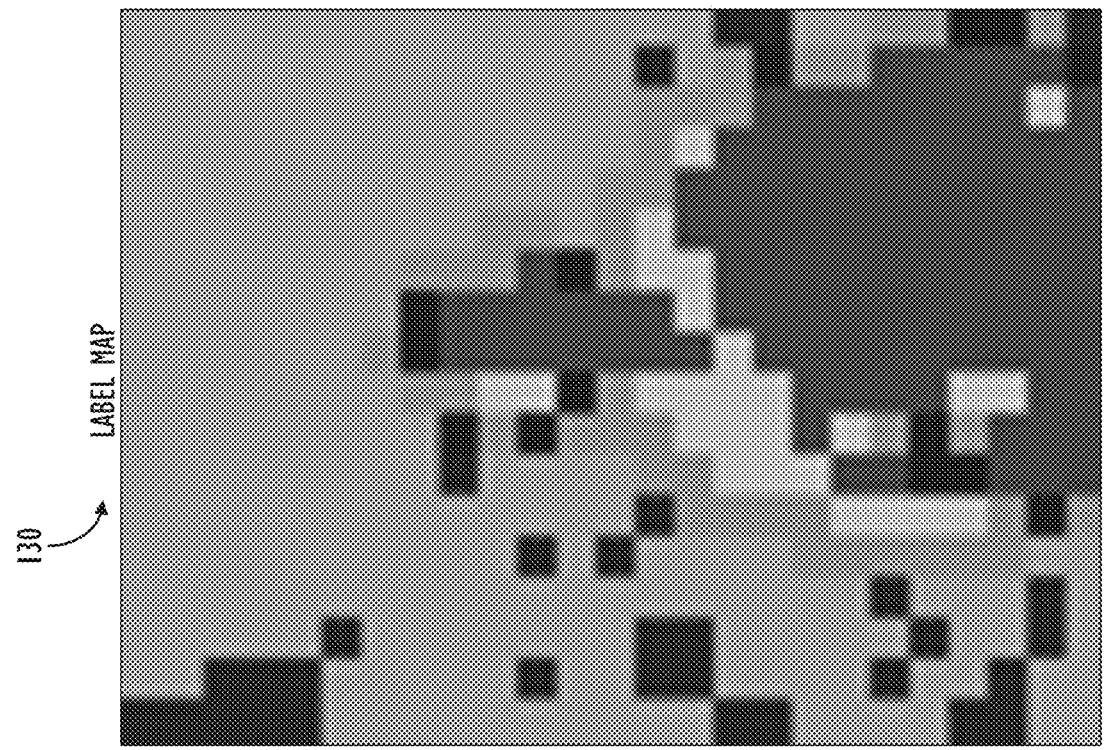
FIG. 1D includes a defocus map and a label map for the image shown in FIG. 1A, according to one or more embodiments disclosed herein.
Figure 1D:
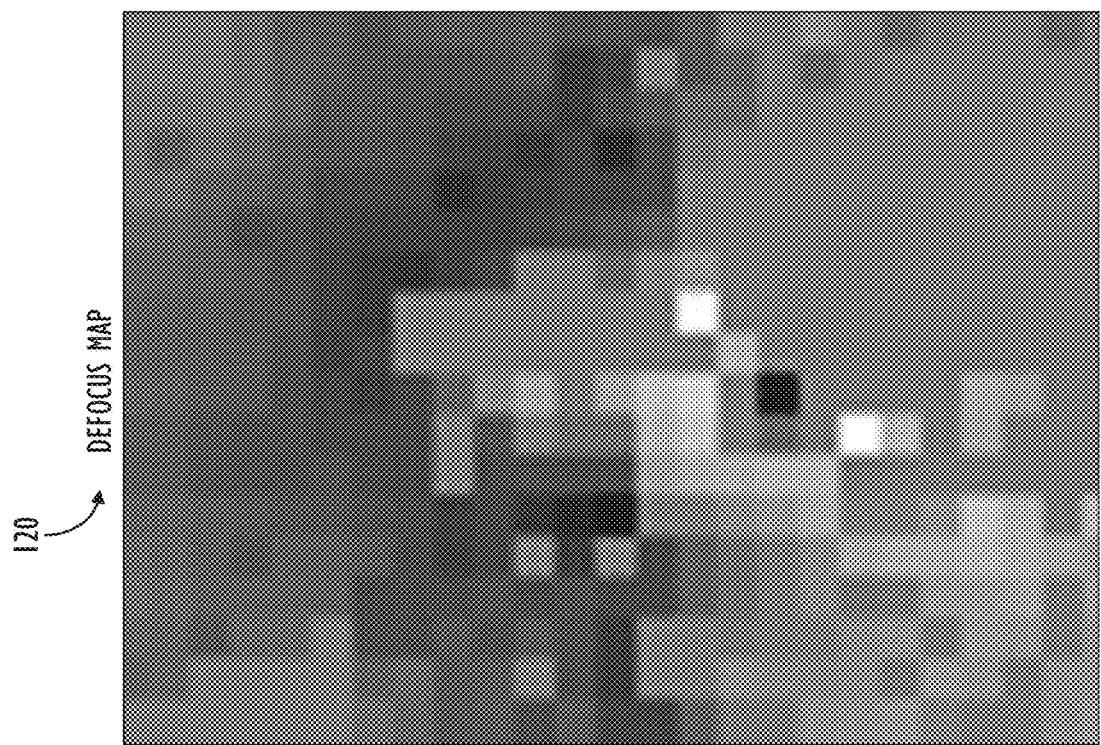

Turning now to FIG. 1D, the defocus map 120 and a label map 130 for the image 100 shown in FIG. 1A are shown, according to one or more embodiments. Label map 130 in FIG. 1D, may represent the result of attempting to classify (i.e., label) the various pixels of defocus map 120 into one or more categories, such as foreground, background, or boundary. For example, in some embodiments, a labeling process may begin with an evaluation of each pixel in the segmentation mask, e.g., segmentation mask 125. (As mentioned above, when the defocus map has a lower spatial resolution than the segmentation mask, each pixel in the defocus map may correspond to a plurality of pixels in the segmentation mask, such as a tile or other sub-region). For example, if a pixel in the segmentation mask (e.g., a non-binary segmentation mask, in this example) has greater than a high threshold ($\theta_{hi}$) value in the segmentation mask, it may be classified as a "foreground pixel," and if a pixel has less than a low threshold ($\theta_{lo}$) value in the segmentation mask, it may be classified as a "background pixel." Otherwise, the pixel may be classified as a "boundary pixel." Then, the pixel-level classifications may be further evaluated at the tile-level within the segmentation mask. For example, if all the pixels in a given tile are classified as foreground pixels, then the tile may be labeled as a "foreground tile," and if all the pixels in a given tile are classified as background pixels, then the tile may be labeled as a "background tile." Otherwise, the tile may be classified as a "boundary tile." It is to be understood that, in the event that a segmentation mask provides binary classifications, the above-described thresholding process may not be necessary. The tiles' classifications in the segmentation mask may then be mapped to the corresponding pixels in the defocus map 120, e.g., for usage in the subsequent defocus map refinement process.

In addition to the classification of each tile as foreground, background, or boundary, some embodiments may also classify a pixel in the defocus map as being either "valid" or "invalid," for the purposes described herein. For example, pixels in the defocus map corresponding to tiles in the original image that contain little or no texture may be classified as "invalid" because there simply may not be enough contrast present in the tile to make a sufficiently confident use of the defocus score corresponding to the tile, e.g., in the subsequent defocus map refinement steps, which will be described in further detail below. In some embodiments, e.g., a tile may be classified as invalid when a confidence value of the corresponding defocus score in defocus map 120 is less than a determined confidence value threshold, and classified as valid when the confidence value is greater than or equal to the determined confidence value threshold.

As may now be appreciated, the variously-shaded tiles in label map 130 in FIG. 1D, represent the result of classifying all the tiles in segmentation mask 125 and, by extension, the corresponding pixels in the defocus map 120, as belonging to one of the following six classes: "foreground valid" (see, e.g., the brightest white tiles in label map 130), "foreground invalid," "background valid," "background invalid" (see, e.g., the darkest black tiles in label map 130), "boundary valid," or "boundary invalid" (e.g., using confidence information associated with the values from the defocus map 120 to judge the validity of the tile classifications). As will be described in greater detail below, the label map 130 may be used to inform the defocus map refinement operations described with respect to FIG. 1E.

Figure 1E:
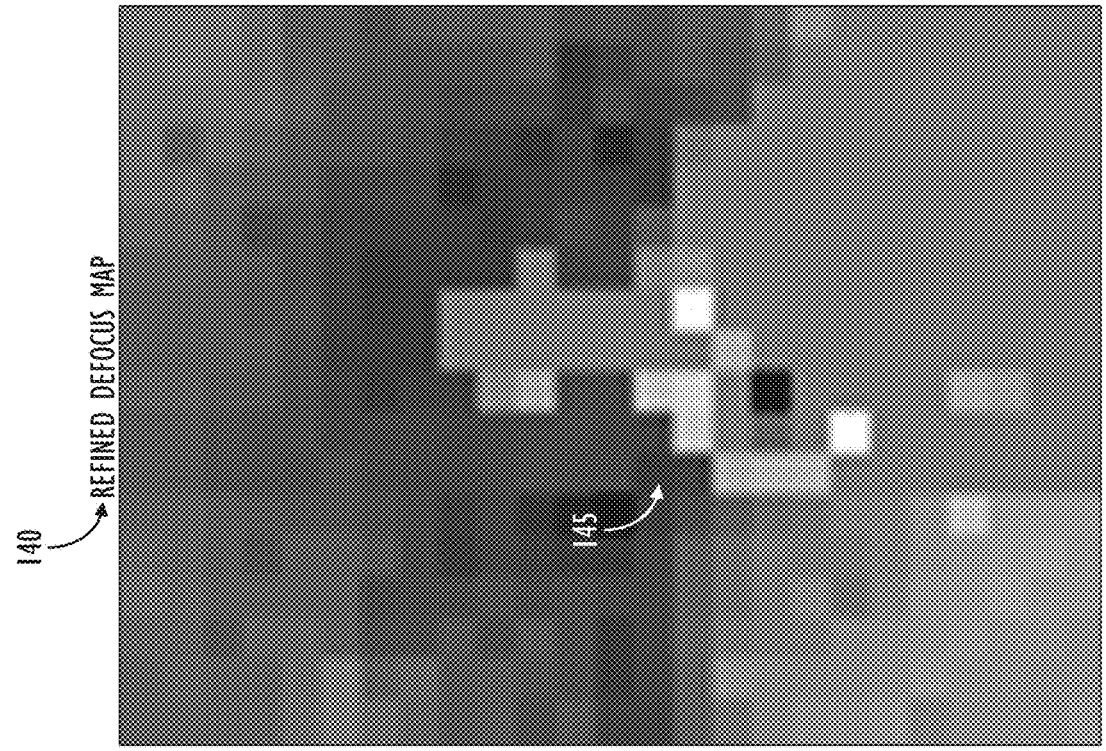
FIG. 1E includes a defocus map and a refined defocus map for the image shown in FIG. 1A, according to one or more embodiments disclosed herein.
Figure 1E:
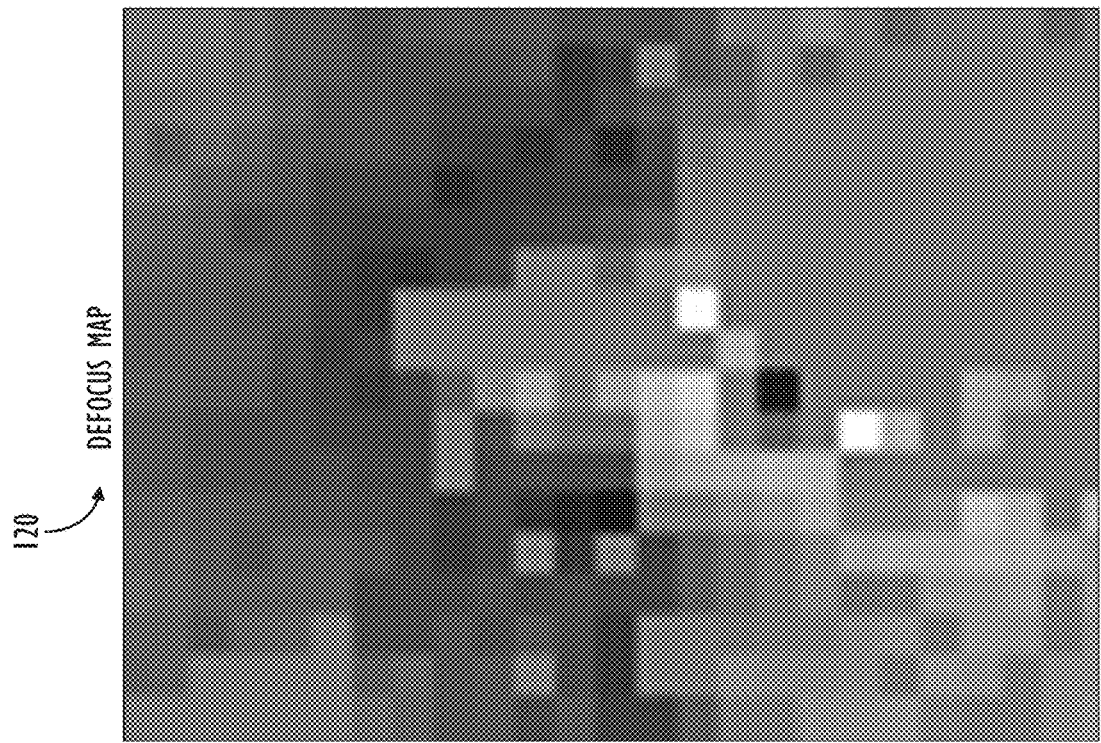

Turning now to FIG. 1E, the defocus map 120 and a refined defocus map 140 for the image 100 shown in FIG. 1A are shown, according to one or more embodiments. In some embodiments, a defocus map refinement process may only refine defocus scores corresponding to tiles that have been identified as "background invalid" tiles or "boundary" tiles. One purpose of the defocus map refinement process may be to "fill in" invalid defocus scores in the defocus map 120 using valid neighboring defocus scores. Thus, according to some embodiments, no further refinement may need to be done for defocus scores corresponding to foreground tiles (be they valid or invalid) or "background valid" tiles. However, further refinement may be desired for boundary tiles, e.g., to attempt to prevent the foreground region of the scene from bleeding into background region of the scene, which may result in unnatural sharp artifacts in portions of the rendered SDOF image that correspond to the background of the scene. Moreover, additional processing resources may be conserved by not attempting to further refine "foreground valid" and "foreground invalid" tiles (as they will likely eventually be overlaid by the segmentation mask, as will be described in further detail below) or "background valid" tiles.

For tiles where it has been determined that refinement operations are to be applied, the refined defocus score value for a defocus map pixel corresponding to a given tile may be determined by calculating the average defocus score values from all neighboring (e.g., adjacent or bordering) tiles that have been classified as "background valid" tiles. In one embodiment, a full refinement search method may be performed, whereby, e.g., a linear search is performed to determine defocus score values from neighboring "background valid" tiles. According to other embodiments, four independent linear search passes may be performed, e.g., in parallel, by having each search pass begin at one of the four different corners of the image. For example, the first linear search pass may start at top left of the image and work to the bottom right of the image, the second linear search pass may start at the top right of the image and work to the low bottom left of the image, the third linear search pass may start at the bottom right of the image and work to the top left of the image, and the fourth linear search pass may start at the bottom left of the image and work to the top right of the image. In other embodiments, any invalid tiles may be located and updated directly, i.e., without performing independent or linear search passes through the full set of tiles.

For each tile that is to be refined, each linear search pass may generate an updated defocus score value for the tile (which, as described above, may correspond to the average defocus score value from neighboring valid background tiles). Then, for each tile, from among the updated defocus score values calculated by the four linear searches, the minimum defocus score value may be selected for use as the tile's refined defocus score value. Smaller defocus score values mean that the corresponding regions of the scene are estimated to be farther from the focal plane, so, in some embodiments, it may be desirable to use the smallest defocus score value in order to further enhance the amount of blurriness in the rendered SDOF image. In other embodiments, however, e.g., the maximum of the defocus score values or an average of the defocus score values (or other desired metric) may be used as the refined defocus score value for a given tile.

Figure 1F:
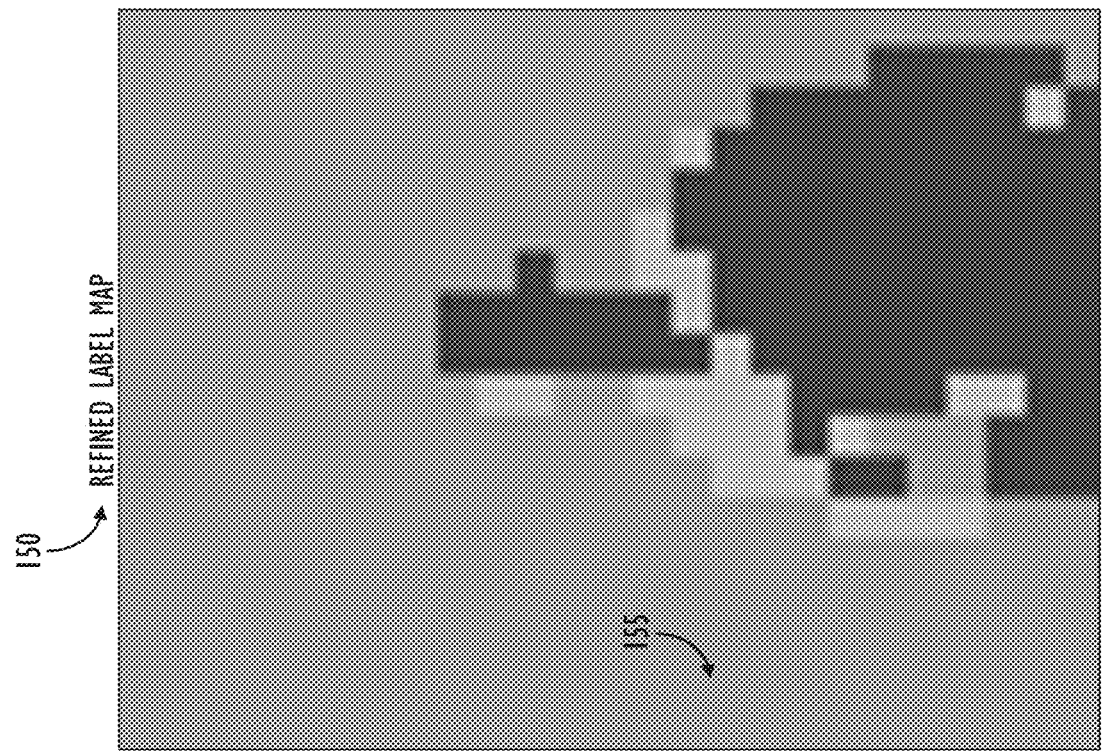
FIG. 1F includes a label map and a refined label map for the image shown in FIG. 1A, according to one or more embodiments disclosed herein.
Figure 1F:
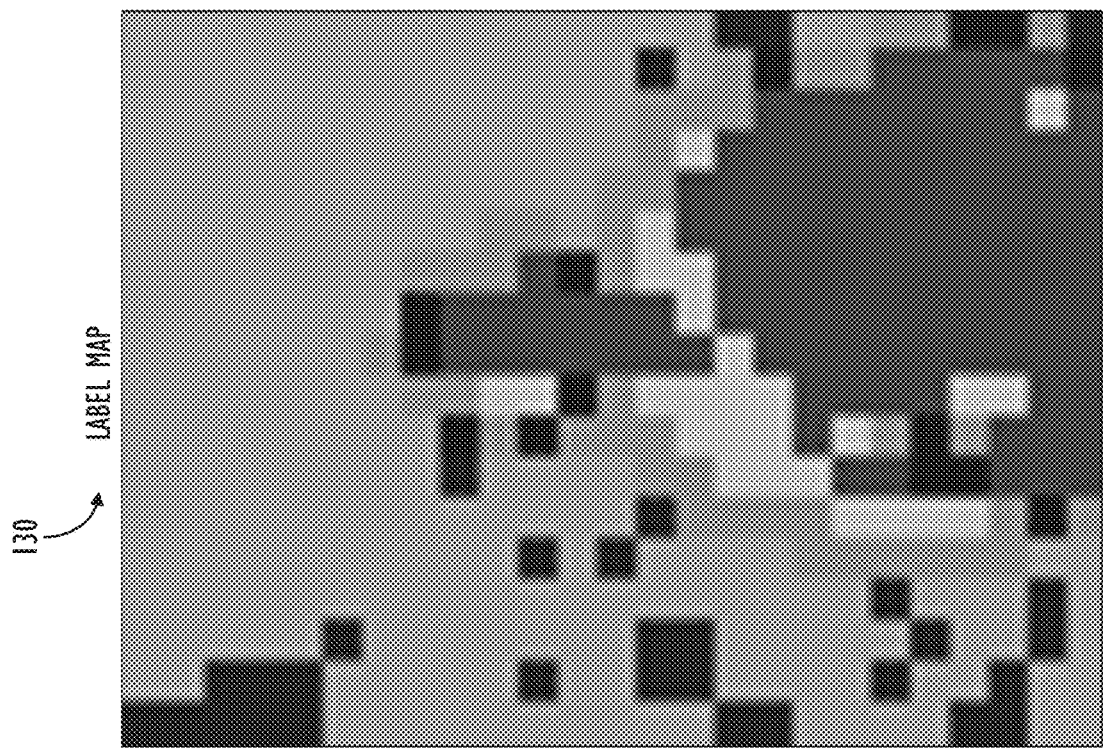

Turning now to FIG. 1F, a label map 130 and a refined label map 150 for the image 100 shown in FIG. 1A are shown, according to one or more embodiments. According to some embodiments, refined label map 150 may be generated based on one or more refinement passes during the creation of refined defocus map 140, discussed above with reference to FIG. 1E, e.g., using the same tile labeling rules described above. As mentioned above, according to some embodiments, the label map 130 may be used to aid in the defocus map refinement process. For example, during the refinement operation, a determination may be made as to which tiles need to be refined (e.g., only "background invalid" tiles and "boundary" tiles may be refined in some embodiments) and also what the label of a given tile has been updated to after a refinement pass. For example, if a "background invalid" tile has been updated to a "background valid" tile after a given refinement pass, e.g., by having an updated defocus score calculated for it based on its neighboring tiles, then the tile's updated defocus score may be used in subsequent refinement passes to aid in the refinement of its neighboring "background invalid" or "boundary" tiles. As illustrated in FIG. 1F, refined label map 150 is smoother and less noisy (e.g., with fewer regions of invalid tiles, especially in the background regions 155 of the captured scene), reflecting the results of one or more passes of the refinement operation. Once the refinement process is completed for a given image, the refined label map 150 may be discarded.

Figure 1G:
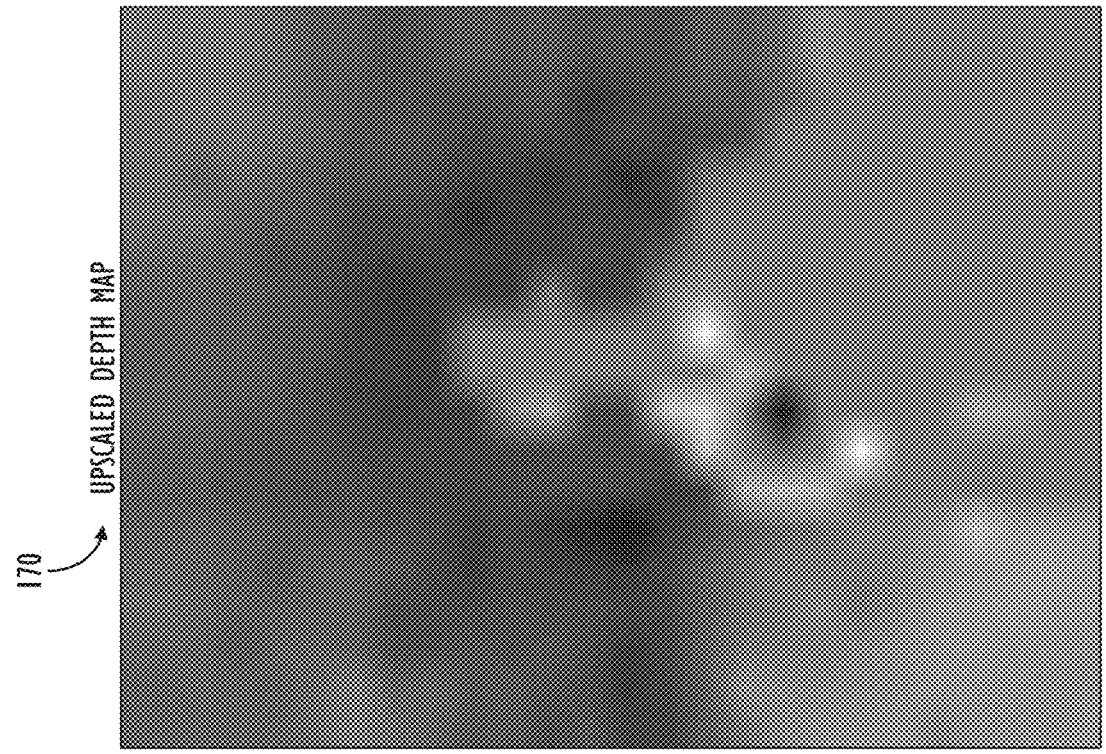
FIG. 1G includes a low-resolution depth map and an upscaled depth map for the image shown in FIG. 1A, according to one or more embodiments disclosed herein.
Figure 1G:
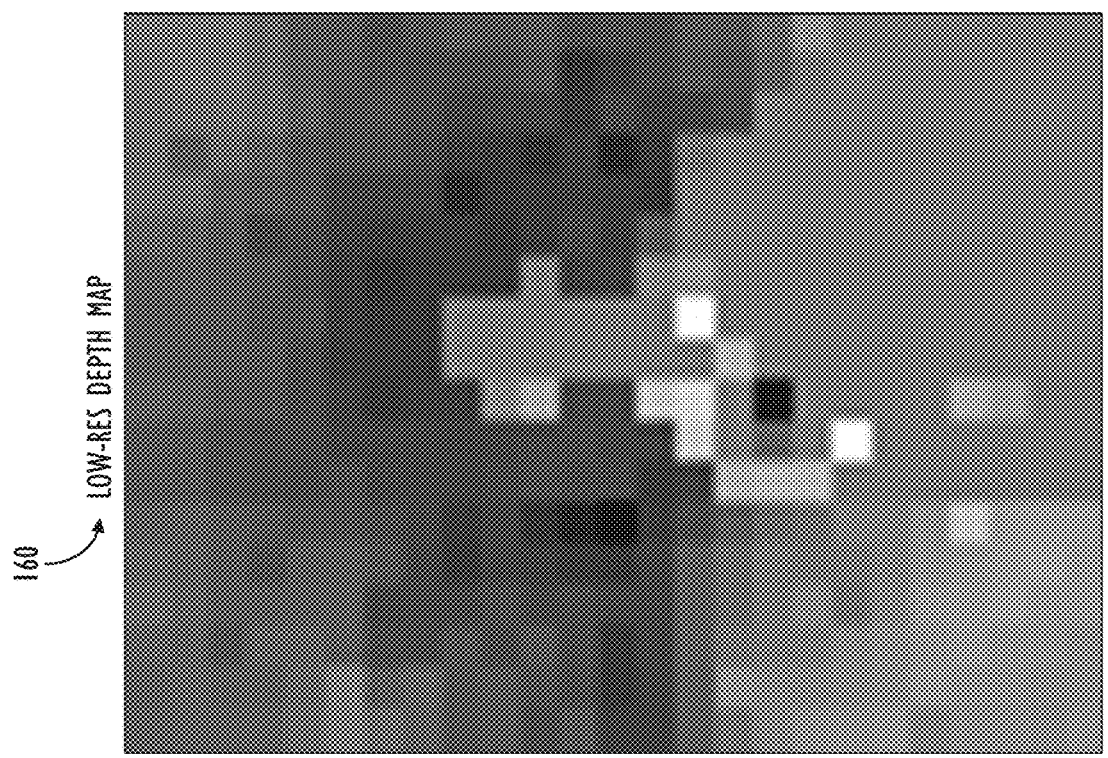

Turning now to FIG. 1G, a low-resolution depth map 160 and an upscaled depth map 170 for the image 100 shown in FIG. 1A are shown, according to one or more embodiments. According to some embodiments, low-resolution depth map 160 may be created via a conversion of refined defocus map 140. Techniques to convert defocus scores to depth values are known in the art, and any such desired techniques may be used. According to some embodiments, determination of depth values for a depth map may be premised on the notion that the inverse of a depth value is proportional to an affine function of the defocus score. In some cases, the relationship between depth values and defocus scores may involve a multiplier and/or an offset, which may be calibrated for a given image capture device.

Upscaled depth map 170 may be created based on depth map 160 using any desired upscaling technique (e.g., bi-linear interpolation, bi-cubic interpolation, spline interpolation, polynomial interpolation, bilateral filtering, guided filtering, etc.). In some embodiments, it may be desirable for the upscaled depth map 170 to have the same resolution that the resultant SDOF image will have. In other embodiments, the upscaled depth map 170 may still have a different resolution than the resultant SDOF image. In some cases, the upscaled depth map 170 may be stored in memory, whereas, in other cases, it may be sufficient to compute and use the upscaled depth map 170 on-the-fly during the SDOF rendering process.

Figure 1H:
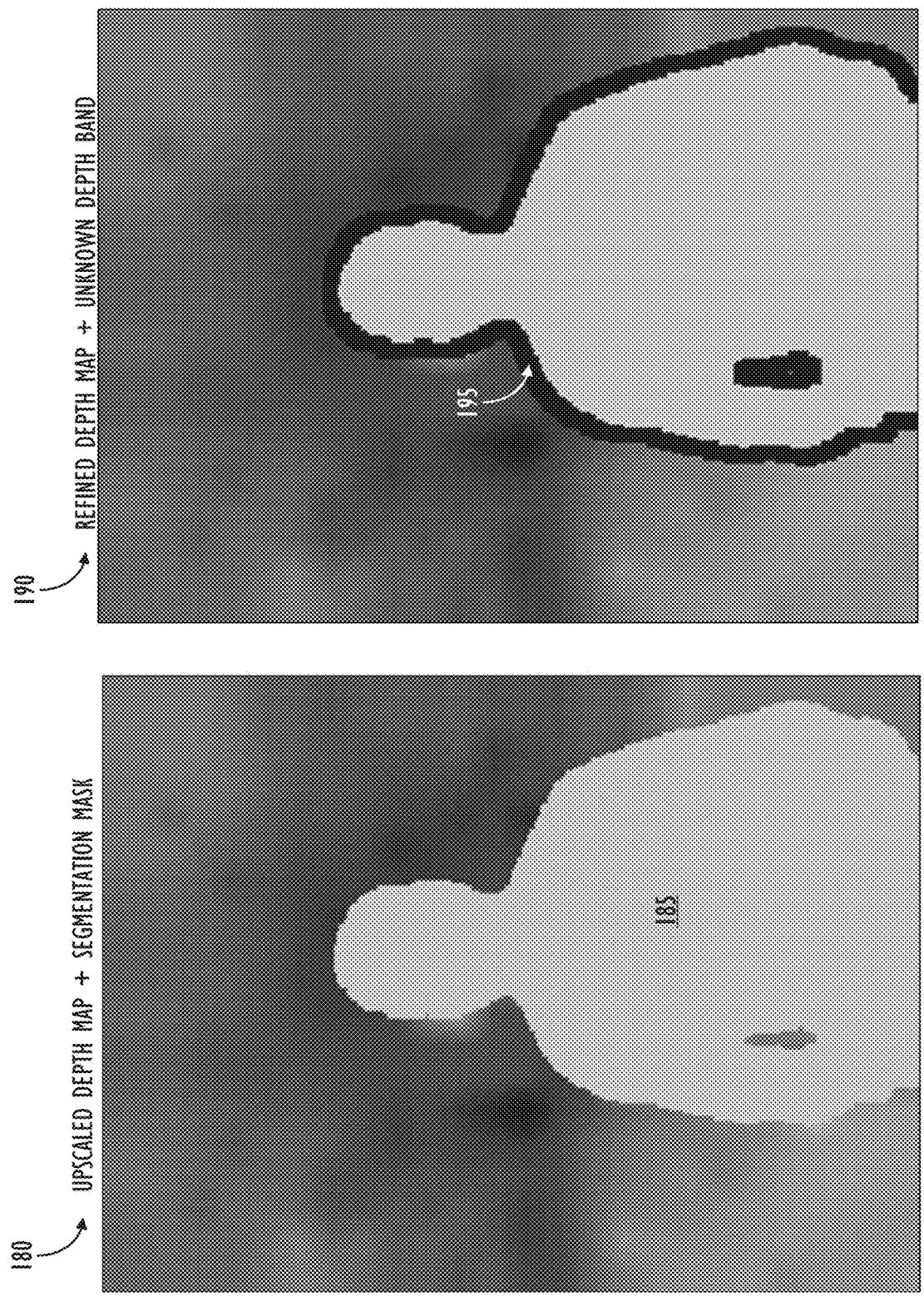
FIG. 1H includes an upscaled depth map with segmentation mask overlay, as well as an upscaled depth map with segmentation mask overlay and unknown depth band, for the image shown in FIG. 1A, according to one or more embodiments disclosed herein.

Turning now to FIG. 1H, an upscaled depth map with segmentation mask overlay 180, as well as an upscaled depth map with segmentation mask overlay and unknown depth band 190, for the image 100 shown in FIG. 1A are shown, according to one or more embodiments. As illustrated in FIG. 1H, the segmented portion 112 of segmentation mask 110 is represented by the outline of the light-colored region 185 in upscaled depth map 180. The light coloration of region 185 indicates that the pixels in this region (i.e., corresponding to human subject 105) will receive minimal (or no) blurring in the rendered SDOF image, which is consistent with the expectation that the photographer would desire to have the foreground objects, such as the human subject 105, be in focus in the resultant SDOF image.

In some embodiments, the region 185 may be filled in with the average depth value from the pixels in the segmentation mask. In other embodiments, a different value may be used in region 185, e.g., the depth value corresponding to a certain percentile of the pixels in the segmentation mask. In still other embodiments, the region 185 may be filled by an arbitrary value. For example, if the defocus score corresponding to an in focus portion of the image is known (e.g., it can be zero or any other arbitrary number), then the depth in the background can be computed relative to this arbitrary foreground depth. The resultant rendered SDOF image could still be rendered correctly, e.g., by configuring the rendering operation to determine the size of the blur to be applied to a given pixel based on the relative difference between the in focus scene depth (e.g., the scene foreground) and the depth of the portions of the scene that are to be blurred (e.g., the scene background).

In some instances, the camera's autofocus (AF) mechanism may have already captured the human subject (and/or other foreground portions of the scene) as being in focus, so no further modifications may be necessary to the pixels within the foreground segmentation mask for the purposes of the SDOF rendering.

Upscaled refined depth map 190 adds an additional so-called "unknown depth band" 195 on top of the upscaled depth map 180. According to some embodiments, the unknown depth band 195 may track the boundary between the segmented foreground region of the scene and the remainder (e.g., background) of the scene. In some such embodiments, alpha matting and/or other desired rendering techniques may be used, e.g., to smooth and refine the transition between the sharp human subject (or other segmented object(s)) in the foreground of the scene and the rest of the scene. For example, in some embodiments, a so-called tri-map technique, which assumes pixel values in the unknown depth band to be one of three classes, e.g.: "foreground," "background" or "undetermined," may be used to initialize the matte and blend between the sharp foreground pixels and the blurred background pixels in the unknown band. Performing boundary refinement techniques such as those described above may also help to soften or reduce the effect of errors or inaccuracies around the edges of the segmentation mask (that may be common, e.g., in the case of facial hair or head hair around the periphery of a human subject in a captured image), which cannot always accurately be classified by the segmentation mask as being 'person' or 'non-person' with a high degree of spatial resolution. If the pixels in the unknown depth band 195 were all rendered as sharp, e.g., it may result in an undesirable number of sharp pixels that are not actually a part of the foreground human subject and/or too rapid of a transition to the heavy blurring of neighboring background pixels. In some embodiments, the alpha blending within the unknown depth band may be further based on the confidences (or relative magnitudes, e.g., in the case of a non-binary segmentation mask) of the corresponding pixels' values within the segmentation mask.

Figure 1I:
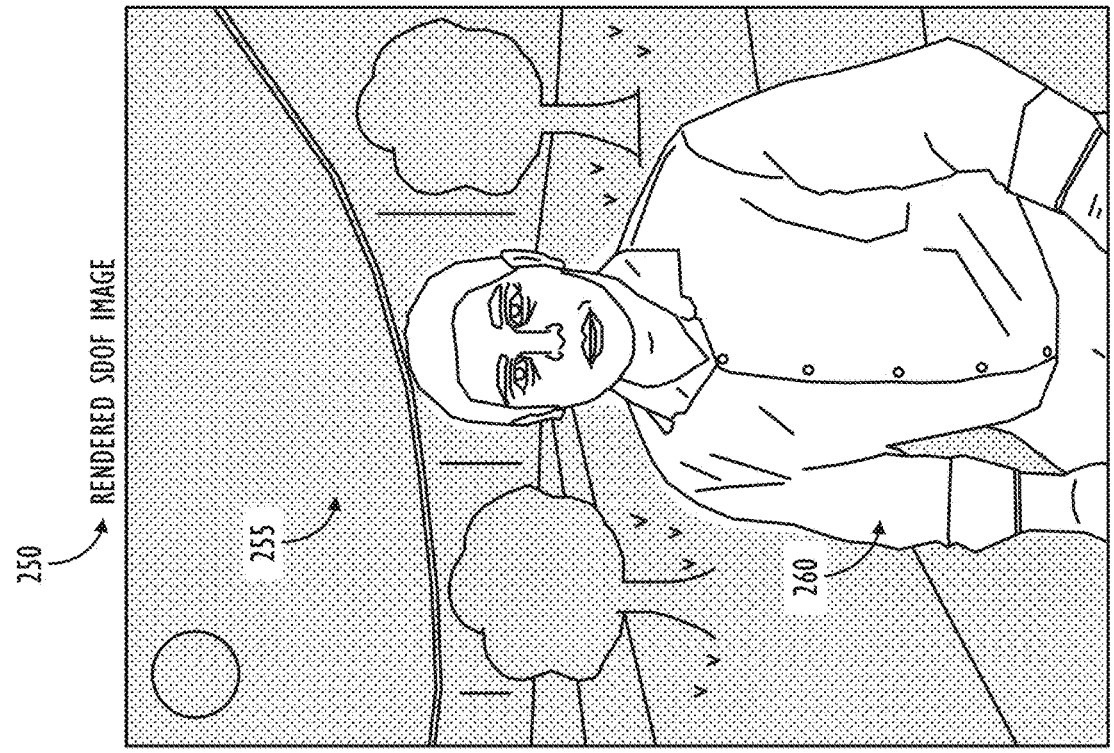
FIG. 1I includes the image shown in FIG. 1A, to which synthetic SDOF effects are desired to be applied, and a version of the image to which synthetic SDOF effects have been applied, according to one or more embodiments disclosed herein.
Figure 1I:
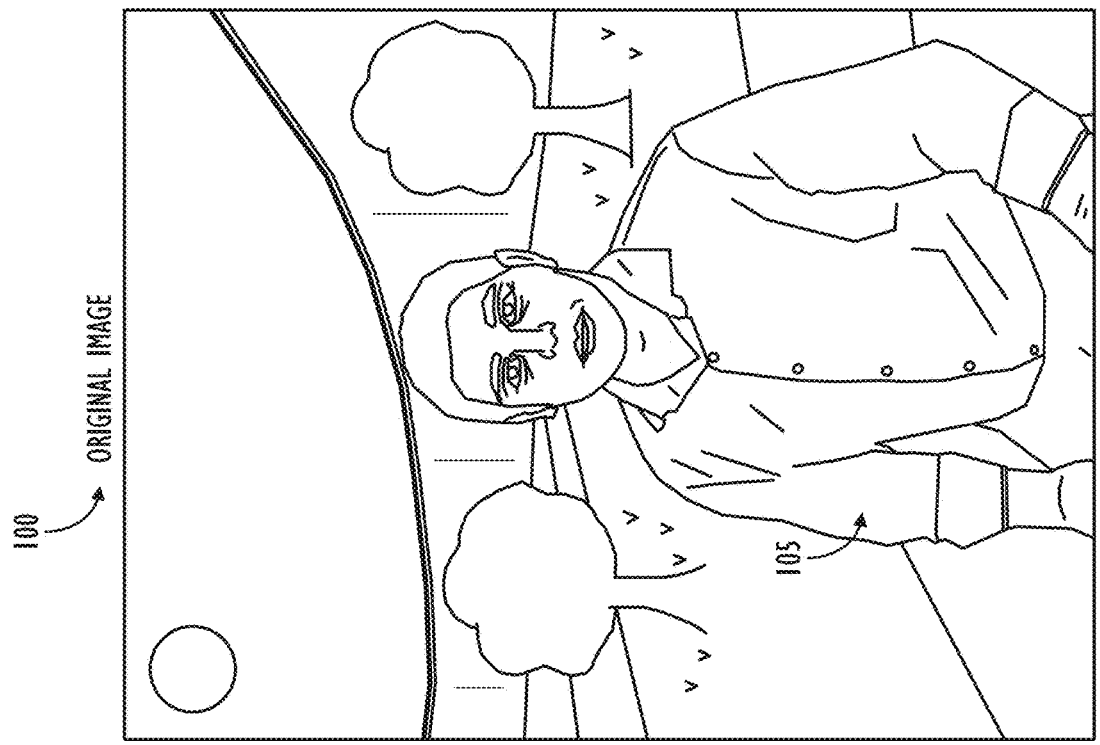

Turning now to FIG. 1I, the image 100 from FIG. 1A of a scene to which synthetic SDOF effects are desired to be applied and a version of the image 250 to which synthetic SDOF effects have been applied, are shown, according to one or more embodiments. As illustrated in FIG. 1I, the representation 260 of human subject 105 in the SDOF image 250 remains largely in focus (i.e., due to the overlay from segmentation mask 110), and the areas in the background 255 of SDOF image 250 have been blurred (as indicated by their partial shading in FIG. 1I), e.g., in accordance with the refined depth map 190 discussed above with reference to FIG. 1H. For example, an amount of blurring applied to a given pixel in the background of SDOF image 250 may be proportional to the given pixel's value in the refined depth map 190, with deeper pixels receiving a relatively greater amount of blurring than pixels that are closer to the foreground of the scene.

Exemplary Process Overview

Figure 2:
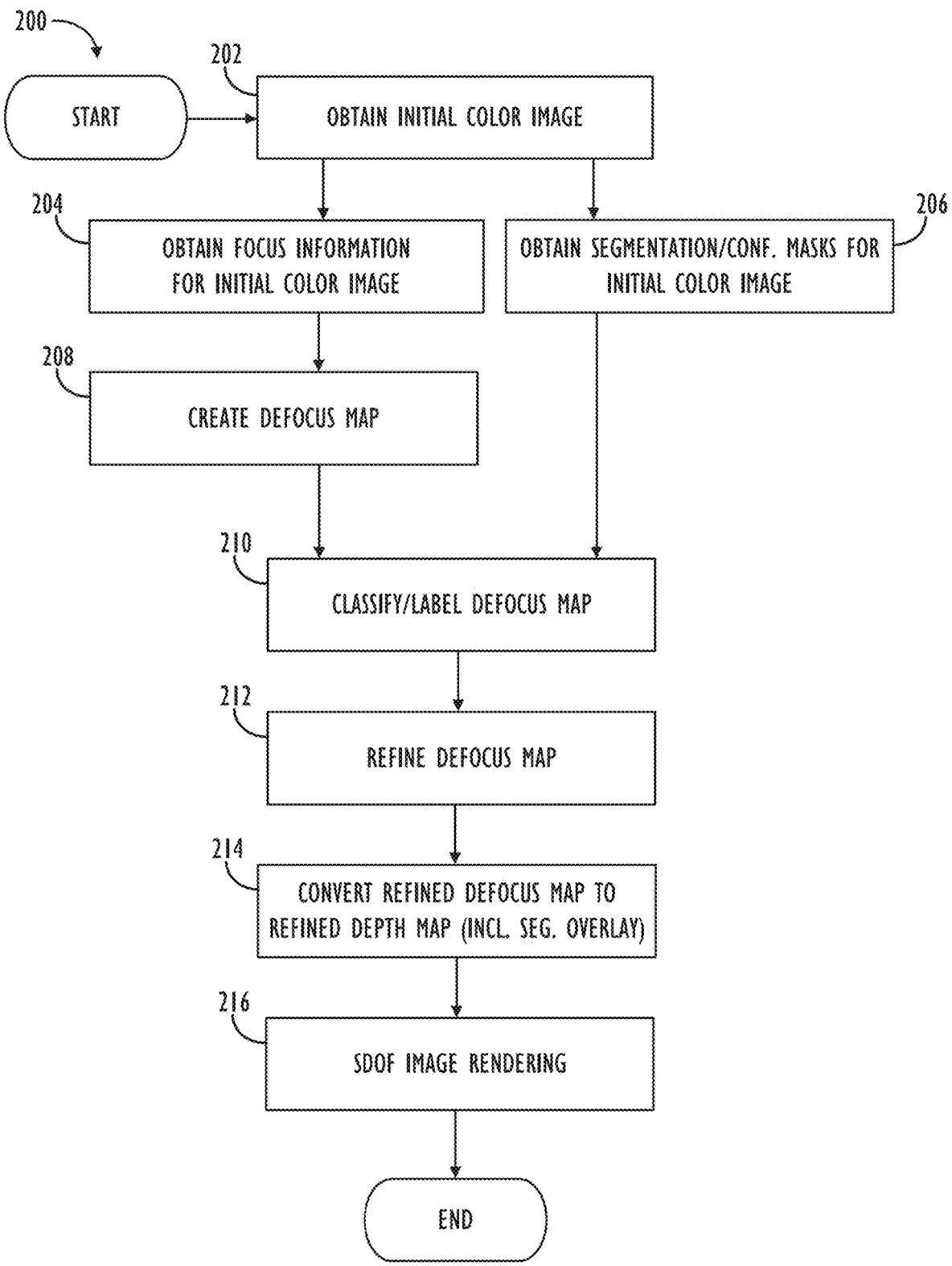
FIG. 2 is an exemplary method for synthesizing SDOF effects using an estimated depth map with segmentation overlay, according to one or more embodiments.

Turning now to FIG. 2, an exemplary method 200 for synthesizing SDOF effects using an estimated depth map with segmentation overlay is shown, according to one or more embodiments described above. First, the method 200 may begin by obtaining an initial color image, e.g., the image 100 shown in FIG. 1A (Step 202). Next, the method 200 may proceed, e.g., in parallel, to obtain focus information for the initial color image, e.g., from any desired depth or phase estimation modality (Step 204) and to obtain one or more segmentation masks for the initial color image and, optionally, the corresponding confidence masks for one or more of the segmentation masks (Step 206).

For example, as discussed above, the focus information obtained at Step 204 may be obtained from, e.g., a set of PD pixels, which may be sparsely distributed over the image sensor used to capture the initial color image. Based on the focus information obtained at Step 204, a defocus map may be created, wherein, e.g., each defocus score in the defocus map corresponds to a sub-region (e.g., tile) of the segmentation mask (and, by extension, the initial color image), as shown in the defocus map 120 and segmentation mask with tile overlay 125 of FIG. 1C (Step 208).

The segmentation masks obtained at Step 206 may comprise binary or continuous segmentation masks. The segmentation masks and corresponding confidence masks may be produced by a neural network or other machine learning-based system, or may be produced by non-machine learning-based methods, as well. The confidence masks may reflect the relative confidence that the segmentation operation has in its classification of any given pixel in the reference color image.

Next, at Step 210, the method 200 may utilize the information stored in the segmentation mask from Step 206 to attempt to classify and label the defocus scores from the defocus map obtained at Step 208 corresponding to the various sub-regions (e.g., tiles) of the segmentation mask, as shown in the label map 130 of FIG. 1D. As described above, a given defocus score in the defocus map may be labeled as corresponding to a tile in the segmentation mask that has been labeled as one of the following classes: "foreground valid," "foreground invalid," "background valid," "background invalid," "boundary valid," or "boundary invalid," wherein the foreground/background/boundary determination for a given defocus score may be made based, at least in part, on the corresponding information from the segmentation mask, and the valid/invalid determination for the given defocus score may be based, at least in part, on a confidence value associated with the given defocus score in the defocus map.

Next, at Step 212, the defocus map may be refined, which refinement operation may include a process of updating the defocus score of one or more pixels in the original defocus map to a blended average of one or more of its neighboring (valid) pixels in the defocus map, as shown in the refined defocus map 140 of FIG. 1E. It is noted that the label map 130 may also be refined, e.g., based on the updated classification of the defocus map pixels determined during the creation of the refined defocus map 140.

Next, at Step 214, the refined defocus map may be converted into an initial depth map, e.g., according to any desired depth conversion technique, and then upscaled, e.g., to the resolution of the initial color image, if so desired, as shown in the upscaled depth map 170 of FIG. 1G. Further, at Step 214, the depth map may be overlaid with foreground depth values based on one or more segmentation masks, e.g., foreground segmentation masks, which will be rendered as sharp (or near sharp) pixels in the resultant SDOF image. Finally, if so desired, an unknown depth band may be added around the border of the segmentation mask overlay, e.g., to refine the transition between the segmentation region and the rest of the captured scene, as described above and as shown in the refined depth map and unknown depth band image 190 of FIG. 1H.

Once the refined depth map has been obtained at Step 214, e.g., as the result of a defocus map refinement operation at Step 212 and/or the application of one or more segmentation overlays and/or the inclusion of an unknown depth band, the method 200 may perform an SDOF image rendering operation (Step 216) that translates the values in the refined depth map into an amount of blurring to be applied at each pixel location in the captured image, thereby generating a synthetic SDOF image, as shown in the exemplary rendered SDOF image 250 of FIG. 1I. According to the embodiments described herein, the rendering of the synthetic SDOF image is able to take place in a lightweight and efficient fashion, and to be produced from only a single camera device and/or without the need for any dedicated depth-sensing technology.

Exemplary System Overview

Figure 3:
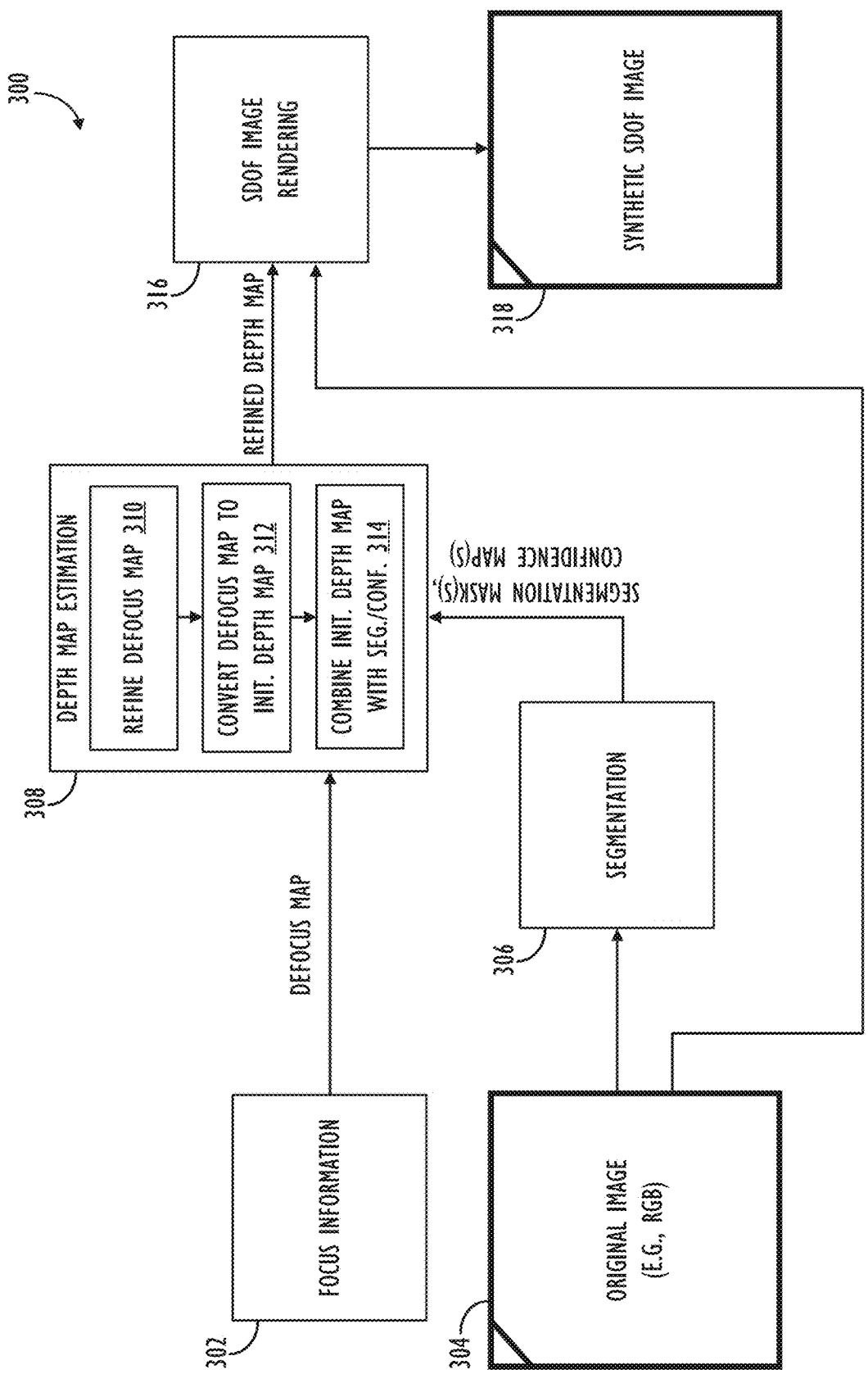
FIG. 3 is a block diagram of a system for synthesizing SDOF effects using an estimated depth map with segmentation overlay, according to one or more embodiments.

Turning now to FIG. 3, a block diagram of a system 300 for generating synthetic SDOF images is shown, according to one or more embodiments. Beginning at the left-hand side of FIG. 3, an original color image (e.g., in RGB format) 304 may be obtained by the system. In conjunction with the original color image 304, initial focus information 302 may be obtained from a desired modality, e.g., in the form of an initial defocus map based, at least in part, on the estimated phase of objects in the original color image 304. Further, segmentation operation 306 may be performed upon the original color image 304, resulting in any number of desired segmentation masks, any number of which segmentation masks may have corresponding confidence masks. As mentioned above, each such segmentation mask produced over the original color image may comprise binary or continuous values. In instances where multiple segmentation masks are obtained, the influence of each such segmentation mask on the refinement of the values in the initial blur map may, e.g.: be equal, be based on the relative confidence of each segmentation mask at a given pixel position, or be individually tuned for the needs of a particular implementation.

Each of the sources of information, i.e.: focus information (302) and segmentation information (306) may then be fed into a depth map estimation operation 308. As described above, depth map estimation operation 308 may: refine the initial defocus map, e.g., based on the various tile labeling and refinement operations described above with respect to FIGS. 1D, 1E, and 2 (Step 310); convert the refined defocus map into an initial depth map and also perform any desired upscaling or modifications to the initial depth map (Step 312); and then combine the initial depth map with information from one or more of the segmentation and/or confidence masks, e.g., in the form of a segmentation mask overlay (Step 314). After combination with the segmentation mask, the initial depth map may then also be augmented with a band of unknown depth along the boundary of the segmentation mask and the rest of the initial depth map, which band may be further processed via alpha matting techniques, as described above. The resulting refined depth map will then be an estimated depth map that has taken into account both the initial coarse focus information and the segmentation information (e.g., by identifying the sub-regions of the captured image which comprise, foreground, background, or boundary sub-regions). The values in the refined depth map may then be translated by an SDOF image rendering process (316), according to any desired translation method, into a corresponding amount of blur to apply to the pixels of the original color image, thus resulting in a synthetic SDOF image (318).

Exemplary Electronic Device

Figure 4:
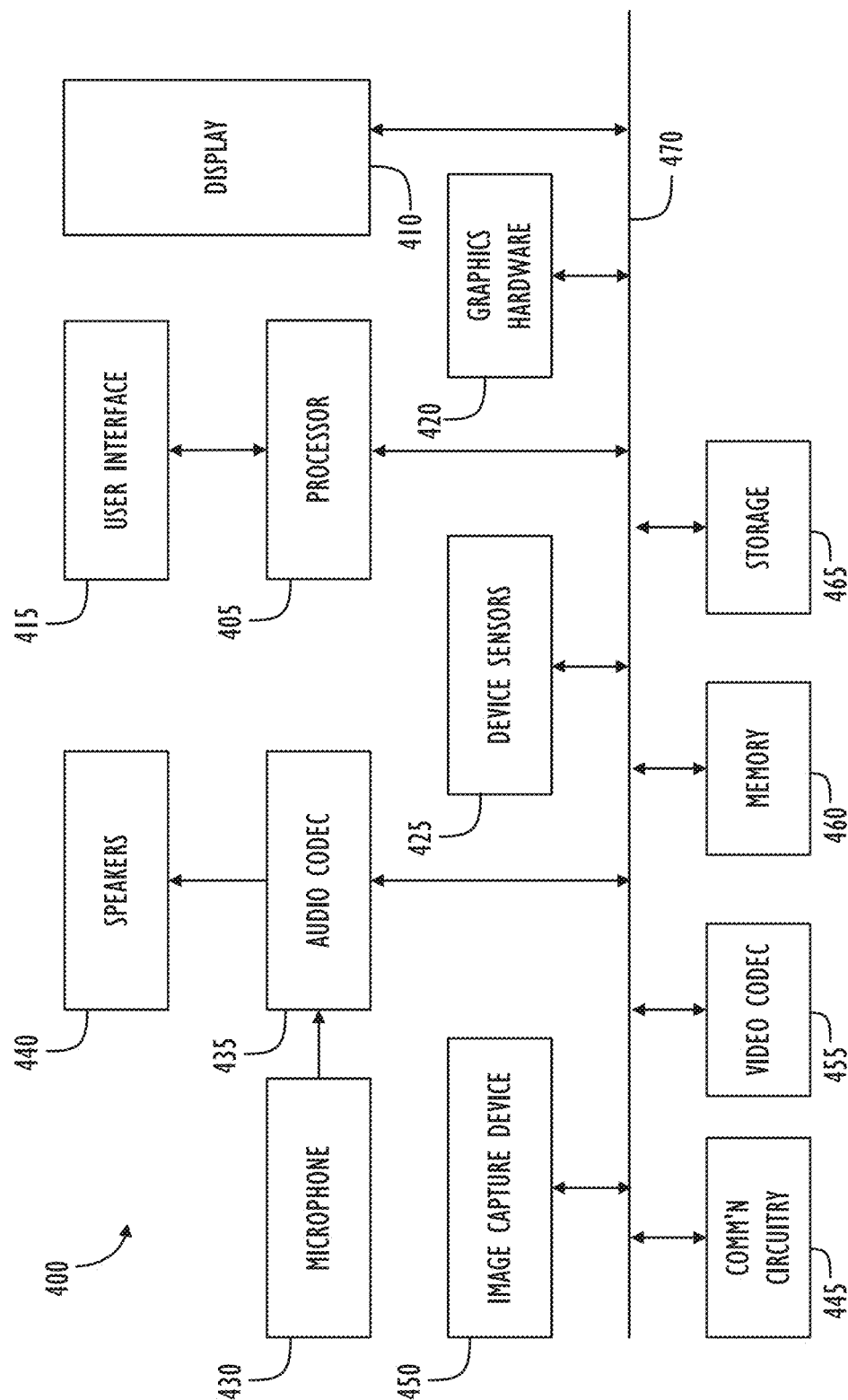
FIG. 4 is a block diagram illustrating an exemplary electronic device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of synthetic SDOF images, in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate synthetic SDOF renderings, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, in some embodiments, there may not always be a uniform relationship between defocus scores and depth estimates over the entire extent of the field of view of the captured image. For example, field curvature effects may affect the relationship between defocus score and estimated depth in certain portions of the captured scene, such as near the corners of the capturing lens, where the field curvature effects are greater and may, e.g., result in overly sharp pixels near the corners of images if not accounted for. Thus, in some embodiments, an image capture device could be calibrated, e.g., in an offline and/or real-time setting, to account for any variations in the relationship between defocus and distance across the field of view of the capturing lens, such as those caused by field curvature effects.

Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
   obtain a first image of a scene, the first image comprising a first plurality of pixels;
   obtain a set of initial focus information for the first image;
   create a defocus map for the first image based, at least in part, on the obtained set of initial focus information;
   obtain at least one segmentation mask comprising a first plurality of segmentation values, wherein each segmentation value corresponds to a location in the scene;
   refine the defocus map, wherein refining the defocus map is based, at least in part, on the first plurality of segmentation values;
   generate an initial depth map based, at least in part, on the refined defocus map;
   generate a refined depth map based, at least in part, on a combination of the generated initial depth map and the obtained at least one segmentation mask; and
   generate a blurred version of the first image based, at least in part, on the refined depth map.

2. The non-transitory program storage device of claim 1, wherein the set of initial focus information is obtained from one or more phase detection (PD) pixels.

3. The non-transitory program storage device of claim 1, wherein the set of initial focus information for the first image is captured by a single camera.

4. The non-transitory program storage device of claim 1, wherein the generation of the blurred version of the first image takes place in a streaming or preview mode.

5. The non-transitory program storage device of claim 1, wherein the instructions to generate a refined depth map further comprise instructions to: upscale the generated initial depth map.

6. The non-transitory program storage device of claim 1, wherein the instructions to generate a refined depth map further comprise instructions to: add an unknown depth band to the initial depth map; and determine depth values for pixels located in the unknown depth band.

7. The non-transitory program storage device of claim 1, wherein the set of initial focus information includes information that was initially obtained during the capture of one or more images other than the first image.

8. The non-transitory program storage device of claim 1, further comprising instructions to cause the one or more processors to label one or more sub-regions in the segmentation mask as at least one of: a foreground sub-region, a background sub-region, or a boundary sub-region.

9. The non-transitory program storage device of claim 8, wherein the defocus map comprises a second plurality of pixels having values, and wherein each of the second plurality of pixels corresponds to one of the sub-regions in the segmentation mask.

10. The non-transitory program storage device of claim 9, wherein each of the second plurality of pixels comprises either a valid or invalid value.

11. The non-transitory program storage device of claim 10, wherein the instructions to refine the defocus map further comprise instructions to cause the one or more processors to:
update the values of the second plurality of pixels in the defocus map corresponding to a sub-region in the segmentation mask that has been labeled as a boundary sub-region; and
update the values of the second plurality of pixels in the defocus map that comprise invalid values corresponding to a sub-region in the segmentation mask that has been labeled as a background sub-region.

12. The non-transitory program storage device of claim 11, wherein the instructions to update a value of a given pixel of the second plurality of pixels in the defocus map further comprise instructions to cause the one or more processors to:
update a value of a given pixel of the second plurality of pixels in the defocus map based on the values of pixels neighboring the given pixel that comprise valid values corresponding to a sub-region in the segmentation mask that has been labeled as a background sub-region.

13. The non-transitory program storage device of claim 12, wherein the instructions to update a value of a given pixel of the second plurality of pixels in the defocus map based on the values of pixels neighboring the given pixel that comprise valid values and that correspond to a sub-region in the segmentation mask that has been labeled as a background sub-region further comprise instructions to cause the one or more processors to:
update a value of a given pixel of the second plurality of pixels in the defocus map to be an average of the values of pixels neighboring the given pixel that comprise valid values corresponding to a sub-region in the segmentation mask that has been labeled as a background sub-region.

14. The non-transitory program storage device of claim 1, wherein the combination of the generated initial depth map and the obtained at least one segmentation mask comprises an operation to overlay the at least one segmentation mask on the generated initial depth map.

15. An electronic device, comprising:
one or more image capture devices;
one or more processors; and
a memory coupled to the one or more processors, wherein instructions are stored in the memory, and wherein the instructions, when executed, cause the one or more processors to:
obtain a first image of a scene, the first image comprising a first plurality of pixels;
obtain a set of initial focus information for the first image;
create a defocus map for the first image based, at least in part, on the obtained set of initial focus information;
obtain at least one segmentation mask comprising a first plurality of segmentation values, wherein each segmentation value corresponds to a location in the scene;
refine the defocus map, wherein refining the defocus map is based, at least in part, on the first plurality of segmentation values;
generate an initial depth map based, at least in part, on the refined defocus map;
generate a refined depth map based, at least in part, on a combination of the generated initial depth map and the obtained at least one segmentation mask; and
generate a blurred version of the first image based, at least in part, on the refined depth map.

16. The electronic device of claim 15, wherein the instructions further comprise instructions that, when executed, cause the one or more processors to:
label one or more sub-regions in the segmentation mask as at least one of: a foreground sub-region, a background sub-region, or a boundary sub-region.

17. The electronic device of claim 16, wherein the defocus map comprises a second plurality of pixels having values, and wherein each of the second plurality of pixels corresponds to one of the sub-regions in the segmentation mask.

18. The electronic device of claim 17, wherein each of the second plurality of pixels comprises either a valid or invalid value.

19. The electronic device of claim 18, wherein the instructions that, when executed, cause the one or processors to refine the defocus map further comprise instructions that, when executed, cause the one or more processors to:
update the values of the second plurality of pixels in the defocus map corresponding to a sub-region in the segmentation mask that has been labeled as a boundary sub-region; and
update the values of the second plurality of pixels in the defocus map that comprise invalid values corresponding to a sub-region in the segmentation mask that has been labeled as a background sub-region.

20. An image processing method, comprising:
obtaining a first image of a scene, the first image comprising a first plurality of pixels;
obtaining a set of initial focus information for the first image;
creating a defocus map for the first image based, at least in part, on the obtained set of initial focus information;

obtaining at least one segmentation mask comprising a first plurality of segmentation values, wherein each segmentation value corresponds to a location in the scene;

refining the defocus map, wherein refining the defocus map is based, at least in part, on the first plurality of segmentation values;

generating an initial depth map based, at least in part, on the refined defocus map;

generating a refined depth map based, at least in part, on a combination of the generated initial depth map and the obtained at least one segmentation mask; and generating a blurred version of the first image based, at least in part, on the refined depth map.

* * * * *